US006993409B2

(12) United States Patent
Jartyn

(10) Patent No.: US 6,993,409 B2
(45) Date of Patent: Jan. 31, 2006

(54) AUTOMATION SYSTEM

(75) Inventor: Hermann Jartyn, Igensdorf (DE)

(73) Assignee: Siemens Aktiengesellschaft, München (DE)

(*) Notice: Subject to any disclaimer, the term of this patent is extended or adjusted under 35 U.S.C. 154(b) by 129 days.

(21) Appl. No.: 10/661,003

(22) Filed: Sep. 11, 2003

(65) Prior Publication Data

US 2004/0111166 A1 Jun. 10, 2004

(30) Foreign Application Priority Data

Sep. 11, 2002 (DE) ................................ 102 42 004

(51) Int. Cl.
*G06F 19/00* (2006.01)

(52) U.S. Cl. ...................................................... 700/169

(58) Field of Classification Search .................. 700/96, 700/159, 169, 173, 175
See application file for complete search history.

(56) References Cited

U.S. PATENT DOCUMENTS 5,978,578 A * 11/1999 Azarya et al. .............. 717/100
2002/0141438 A1* 10/2002 Smith et al. ................ 370/465
2004/0054829 A1* 3/2004 White et al. ................ 710/105

FOREIGN PATENT DOCUMENTS

DE 42 13 792 A1 10/1993
DE 196 21 384 A1 11/1996
DE 198 13 923 A1 10/1999
DE 198 40 562 A1 3/2000
DE 198 53 205 A1 6/2000
DE 199 55 306 C1 6/2001
DE 100 55 163 A1 7/2002

OTHER PUBLICATIONS

Profibus Profile-Order No. 3.172, Sep. 2000.
"Bus-Protokolle im Vergleich; Heute: Der InterBus-S", in: Automation Precision, Jan. 1995.
W. Blome: InterBus-S Netzwerk mit hoher Dynamik in: Elektrie, Berlin 46, 1992.
R. Bent: Die vier Dimensionen von Interbus, in: mpa, Jun./Jul.-1999.

* cited by examiner

*Primary Examiner*—Leo Picard
*Assistant Examiner*—Chad Rapp
(74) *Attorney, Agent, or Firm*—Henry M. Feiereisen

(57) ABSTRACT

An automation system as well as a method for programming a data communication for an automation system are described. Components are stations participating in the data communication. Sub-components can be associated with the components. A data message of the data communication includes data locations which can be freely associated with a sub-component. Data messages are generated automatically if the configuration of the automation system and the associated structure of the data communication are known.

22 Claims, 5 Drawing Sheets

SPC
DA2
AT
AN3
AN4
ANX
SL3
A3 A4 Ax

Sp1
Sp2
Sp3
StT1
PZDNo
Set
PZD number
1
2
Setpoint
STW1
NSOLL_A
Z1
Z2
Act
Actual value
ZSW1
NIST_A
Z3
Z4
StT2
NSOLL_B
STW2
NIST_B
ZSW2
StT3
DP
G1_STW
G1_ZSW
G1_XIST1
G1_XIST2
StT4
G2_STW
G2_ZSW
G2_XIST1
G2_XIST2
StT5
XERR
KPC

| | PZD number | 1 | 2 | 3 | 4 | 5 | 6 |
|---|---|---|---|---|---|---|---|
| Set | Setpoint | STW2 | NSOLL_B | | STW2 | G1_STW | STW3 |

| | PZD number | 1 | 2 | 3 | 4 | 5 | 6 | 7 |
|---|---|---|---|---|---|---|---|---|
| Act | Actual value | ZSW1 | NIST_B | | ZSW2 | G1_ZSW | G1_XIST1 | |

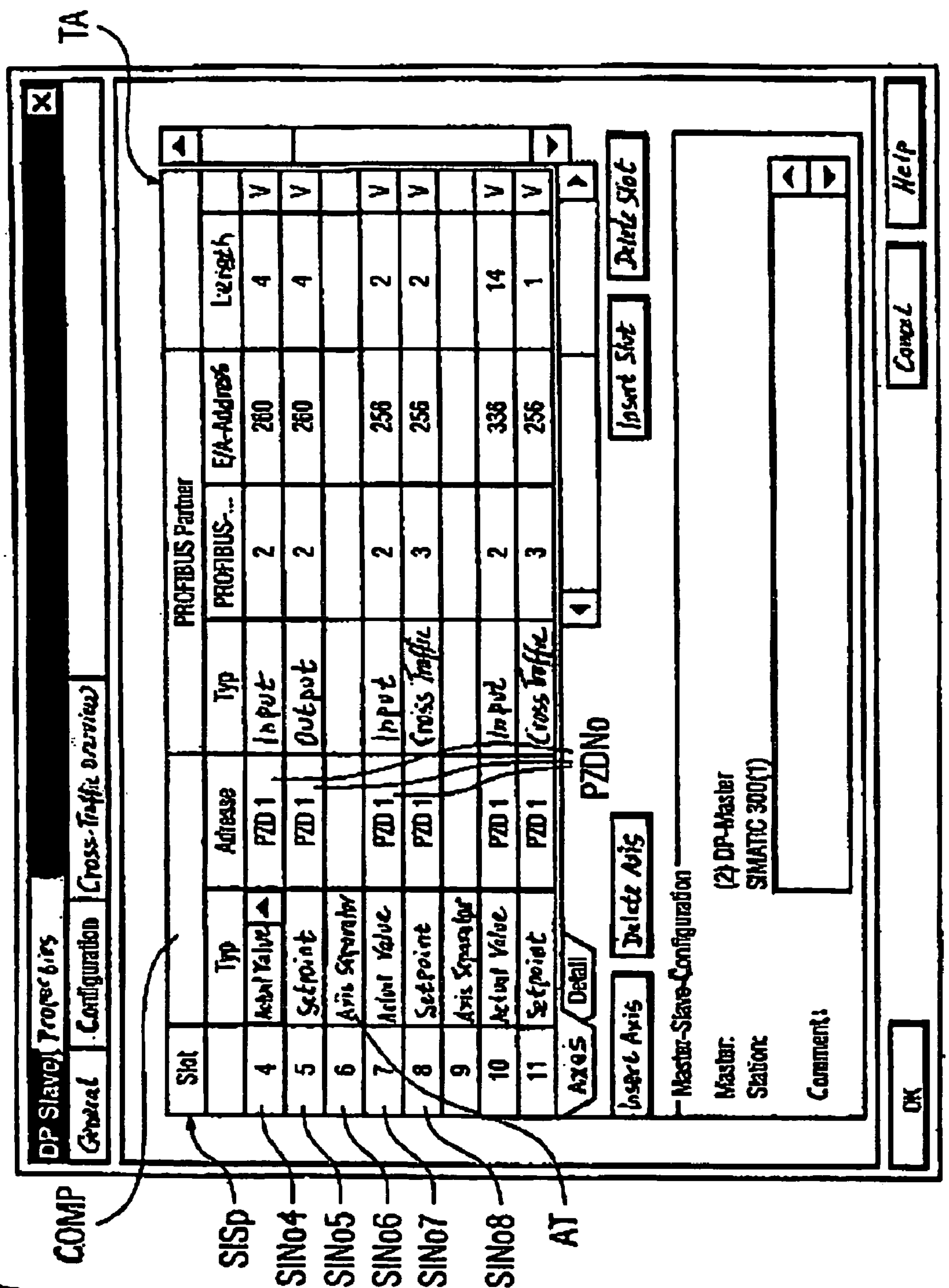
FIG 7
COMP
SISp
SINo4
SINo5
SINo6
SINo7
SINo8
AT
TA
PZDNo
DP Slave Properties
General
Configuration
Cross-Traffic overview
Slot
Typ
Adresse
PROFIBUS Partner
PROFIBUS-...
E/A-Address
Length
Actual Value
Setpoint
Axis Separator
Input
Output
Cross Traffic
PZD 1
Axes
Detail
Insert Axis
Delete Axis
Insert Slot
Delete Slot
Master-Slave-Configuration
Master:
Station:
Comment:
(2) DP-Master
SIMATIC 300(1)
OK
Cancel
Help

AUTOMATION SYSTEM

CROSS-REFERENCES TO RELATED APPLICATIONS

This application claims the priority of German Patent Application, Serial No. 102 42 004.1, filed Sep. 11, 2002, pursuant to 35 U.S.C. 119(a)–(d), the disclosure of which is incorporated herein by reference.

BACKGROUND OF THE INVENTION

The present invention relates to an automation system for a machine-tool, a production machine or a robot, with at least two components connected via a data link, wherein a data message which includes data for a component can be sent between the components. The invention also relates to a method and to an engineering system for programming a data communication of the automation system.

Automation systems for machine-tools, production machines and/or robots are known in the art. The automation system can include several components, and a data connection or data link can be established between the components. The data are exchanged between the components via data messages. The exchanged data messages or the data messages to be sent include data for the components. The data messages also include the data locations. Certain data information is associated with each data location. The data messages between an automation system are standardized. An example for such message system is the PROFIBUS (Process Field Bus), in which, for example, profiles for axle drives are defined in master-slave-combinations in a profile referred to as PROFIdrive. A publication “Proposal PROFIBUS Profiles”, PROFIdrive-Profile, Drive Technology, Version 3, September 2000, can be ordered under the order number 3.172.

In a conventional automation system with a data link, a data communication between components disadvantageously takes place using predefined standardized data messages, which results in an inflexible message configuration.

If a conventional data message is to be adapted to a specific communication environment, then the master data of the device have to be changed. The device master data in an automation system are typically inaccessible to a user.

It would therefore be desirable and advantageous to provide an automation system with an improved data link between components of the automation system, which obviates prior art shortcomings and is able to specifically provide improved programming of a data communication in the automation system.

SUMMARY OF THE INVENTION

According to one aspect of the invention, an automation device, in particular for a machine-tool, a production machine or a robot, includes at least two components connected via a data link, and at least two sub-components that can be associated with a component. A data message, which includes data for the components and a plurality of data locations, can be sent between the at least two components. The number of the data locations within a data message is adjustable and each of the data locations can be associated with one of the sub-components.

One component of such automation system can be programmed or parameterized, for example, as a master, while another component or other components can be programmed or parameterized as slave(s). A bus system, such as the PROFIBUS (Programmable Field Bus), can be employed as a data link. The data message can be or is subdivided into data locations. A component has at least two additional sub-components, or two additional sub-components can be associated with a component representing a slave or a master component, whereby the number of data locations within a data message can be adjusted. The data locations can thereby be associated with a corresponding one of the sub-components. The flexible configuration of the data messages allows flexible programming and/or a flexible configuration of a data network. This flexibility is available to a user via software programs, such as an engineering tool.

Bus systems communicate with connected components through addresses which are assigned to different components of the automation system. In large automation systems, the available number of addresses can be smaller than the number of the addresses required for all the installed components. According to the invention, data locations of a data message can be associated with a number of 2, 3, 4 or more sub-components with different sizes. The introduction of sub-components hence eliminates the limitations otherwise imposed by an insufficient number of available addresses.

According to an advantageous feature of the invention, an exemplary n-axes decentralized PROFIBUS slave can be included as a station in a data network with structured message selection. A user can select a specific message for each axis. The slave can also be viewed as a container for a number of objects, for example n objects, whereby an object represents a sub-component in the software for generating a data message. An object relates, for example, to a drive and can therefore also be referred to as a drive object. Another object, for example, refers to a terminal module for distributing data and can therefore also be referred to as terminal object. Another object, for example, relates to a cam connection, which can also be referred to as cam connection object. With this container-based representation, a predefined combination of data locations for the sub-components, such as scheduling modules, input/output devices (I/O devices) etc., can be presented in the slave container as objects and associated with a data message. A user can then select structured messages for axes representing potential sub-components or, more generally, for objects.

According to another advantageous feature of the invention, the data telegram can be subdivided into channels, wherein data of a channel relate to a sub-component. The data for a component with at least two sub-components, such as two axes, can hence be subdivided into channels, with a channel for an axis also being referred to as an axis channel. A standardized as well as a free combination of data locations is available for each channel or axis channel. According to one advantageous embodiment, the standardized combination of data locations closely resembles the content of data locations of conventional data telegrams. A user of the automation system of the invention, or of the method according to the invention, can thereby readily take advantage of the flexibility afforded to generate data messages. A message selection table can be used for selecting a combination of data locations. For example, the message selection table offers conventional standard messages for selection with respect to their content of data locations. In this way, a new data message with data locations based on the data locations of known standard messages can be generated. Various standard messages, which in conventional applications are represented by individual independent data messages, can thereby be packaged into a single data message. This can be viewed as a type of container.

The data location within a data message has, for example, a standardized content. A standardized content can be, for example, a control word, a state word, a setpoint, an actual value, an amplification factor, etc.

The sub-component of the automation system is, for example, an axis, a terminal module or a transmitter. Different numbers of different sub-components can be associated with a component.

The components of the automation system within the data link can be programmed, for example, as a slave or a master. A master is, for example, a stored-program control, for example, a drive controller with control functionality, or other stations in the data link.

According to another aspect of the invention, a method for programming a data communication of an automation system, for a machine-tool, a production machine or a robot, the system including at least two components connected via a data link and exchanging a data message that includes data locations and data for a component, includes the steps of adjusting the number of the data locations of the data message for those components that have at least two sub-components, and associating each of the data locations with a respective one of the sub-components in one-to-one correspondence.

According to yet another aspect of the invention, a method for programming a data communication of an automation system, for a machine-tool, a production machine or a robot, the system including at least two components connected via a data link and exchanging a data message that includes data locations and data for a component, includes the steps of programming the automation system and the at least two components with an engineering system, associating two sub-components with at least one component, wherein the component or sub-component includes a predefined function, automatically composing the data message, and automatically associating a data location with one of the sub-components when the data message is automatically composed.

In the afore-described methods, the data telegram can be subdivided into channels, for example by using object separators. Data of a channel relate to a sub-component. A sub-component in the context of data messages is an object. The object separator is referred to as axis separator if two objects represent sub-components associated with two axes.

The afore-described method for programming a data communication, a configuration data region of a slave can be flexibly subdivided into n axis channels. A message selection table is offered for each axis channel. If the data messages are generated automatically, then the message selection table can be implemented in the engineering system such that automatic access is enabled. In a table overview over all axes, a user can individually select and adjust a drive profile for each axis. For example, if a standard message is selected from the message selection table, then the data locations of this standard message can be changed when the axes are assigned. If a sub-component represents an axis and if several axes are associated with a component, then a separate axis channel is obtained for each axis. The data for the components with several axes within a data message are then subdivided into axis channels, whereby a message selection table is available for each axis channel.

Besides axes, other technological objects, such as a terminal, a cam connection, etc., can be defined as an object, so that a user can employ—either severally or in combination—additional channels for non-specific technological tasks, such as switching cam connections, to solve an automation problem. The message selection table can therefore be configured so as to offer such technological messages for selection.

A data location can include, for example, a standardized content. Such standardized content is, for example, in particular actual value, a setpoint, a control word, a state word or another parameter.

The contents can also be dependent on the type of the sub-component. For example, the sub-component can be an axis, so that the data of data locations represent a drive profile for an axis, wherein the drive profile can include, for example, data from a transmitter.

According to yet another aspect of the invention, an engineering system with corresponding software can be configured for programming a data communication in the afore-described automation system using one or more of the afore-described methods.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7 shows an input window of an engineering system for selecting the data locations.

DETAILED DESCRIPTION OF PREFERRED EMBODIMENTS

Figure 1:
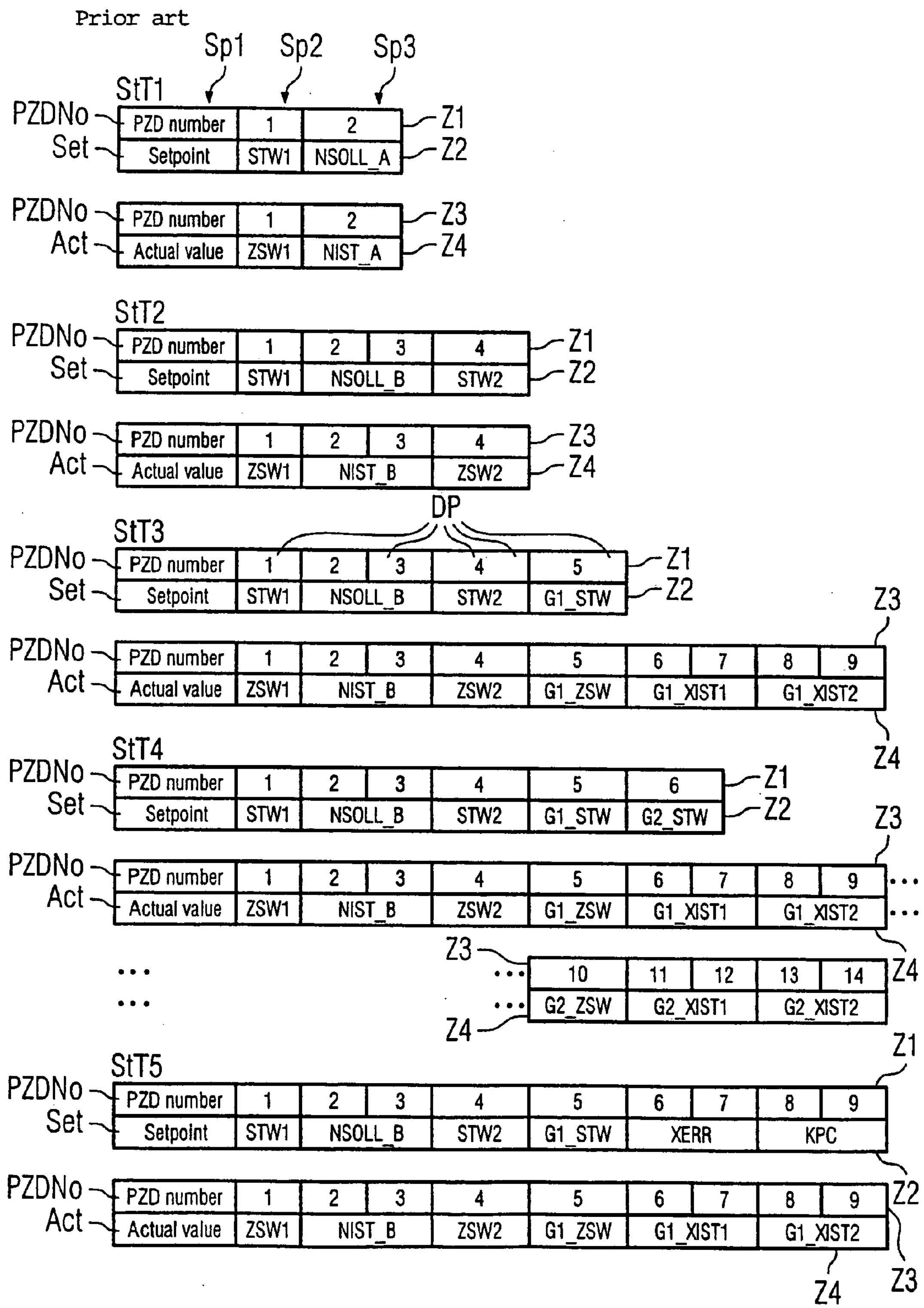
FIG. 1 shows data messages of a conventional automation system.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there are shown several types of standard messages according to the PROFIBUS standard. The depicted example represents the profile PROFIdrive Drive Technology, Version 3, September 2000, referenced above. Illustrated are standard messages StT1 to StT5. The standard messages StT1 to StT4 are defined for rotation-speed-controlled operation. The standard messages are selected using a software planning tool for process data (not shown). The structure of the standard telegrams StT1 to StT5 is symbolically depicted in the diagram as follows:

The first row Z1 of the first standard message StT1 shows in the first column Sp1 the content type of the first row Z1. The first row Z1 is reserved for a process data number (PZD-Number) PZDNo. The second row Z2 shows a setpoint Set, whereas the process PZD-Number PZDNo is again listed in the third row Z3. An actual value Act corresponding to the process data numbers is listed in the fourth row Z4. A setpoint is, for example, a control word STW1, as depicted in the second row Z2 in the second column Sp2. This control word STW1 includes different bits or bytes which have a control functionality. An additional setpoint Set is, for example, the rotation speed setpoint NSOLL_A in the first row Z1 and the third column Sp3. A state word ZSW1 is also associated with the process data number 1 PZDNo. The state word ZSW1 is an actual value Act. A second actual value is listed under the process data number 2, representing the actual rotation speed value NIST_A. The setpoint NSOLL_A refers to an axis labeled A. The actual value NIST_A refers to the same axis A.

Unlike the standard message 1 StT1, which has two process data numbers PZDNo, a standard message 2 StT2 includes four process data numbers PZDNo 1, 2, 3 and 4. In addition to the control word STW1 and the state word ZSW1, the standard message 2 StT2 also has a control word 2 STW2 and a state word 2 ZSW2. These additional control words expand the standard message 2 StT2. The standard message 2 StT2 is furthermore expanded because the rotation speed setpoint NSOLL_B and the actual rotation speed value NIST_B for an additional axis B have a greater length than the setpoint and/or the actual value in the standard message 1 StT1. Doubling the length in the standard message 2 StT2 increases the accuracy.

Unlike the preceding standard messages 1 and 2, StT1 and StT2, the standard message StT3 includes data locations D8 for a transmitter G1 (not shown in FIG. 1), wherein the data locations are characterized by the process data numbers PZDNo. The transmitter G1 is supplied with a control word G1_STW, with a state word G1_ZSW, with an actual value 1 G1_XIST1 and an actual value 2 G1_XIST2.

Unlike the standard message 3 StT3, the standard message 4 StT4 supplies additional actual values Act on the process data numbers PZDNo 10, 11, 12, 13, 14 to a second transmitter G2 (not shown). The setpoint Set is represented by the data locations with the process data number 6 and by the setpoint G2_STW.

Unlike the standard messages 1 to 4, StT1 to StT4, the standard message 5 StT5 has two additional types of setpoints Set. One of the setpoints is provided for a value XERR with a dual-width data location, i.e., with a data location having the process data numbers 6 and 7, PZDNo 6 and PZDNo 7, respectively. The other setpoint Set is provided for an amplification factor KPC.

Accordingly to the conventional technology described above, a standard message is selected for a communication. This has the disadvantage that certain data locations have to be selected even if these data locations are not used for process data numbers. This results in unnecessarily long messages, which increases the data message traffic in a data communications system of an automation system. Such data links increase the transmission time and lower the performance of the system. In addition, the components to be included in a data network cannot be greater than a certain number determined by the size of the available address space. The system and method of the invention advantageously overcomes these limitations by introducing sub-components.

Figure 2:
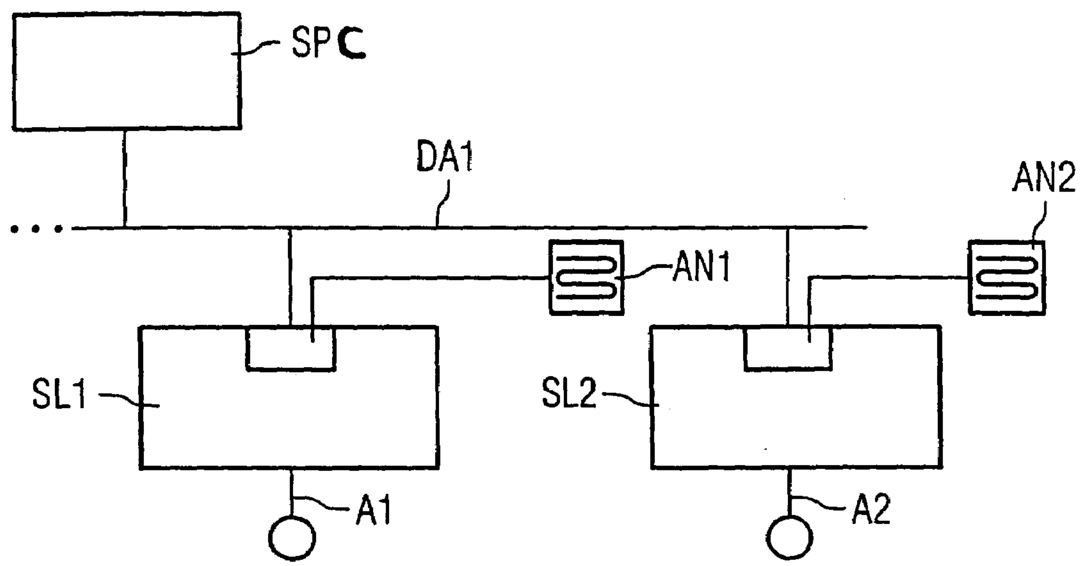
FIG. 2 shows a segment of a conventional data network of the automation system.

The diagram of FIG. 2 depicts a conventional data link DA1 which connects for data transmission a stored-program control SPC with a slave 1 SL1 and a slave 2 SL2. The slave 1 SL1, the slave 2 SL2 and the stored-program control SPC represent components of the data link DA. The stored-program control SPC operates here as a master for the slaves SL1, SL2. Only one sub-component is associated with each slave SL1, SL2. An axis A2 is associated as a sub-component with the slave 2 SL2. The slaves SL1, SL2 include drive profiles AN1, AN2 for the axes A1, A2. Depending on the drive profile, standard messages StT1 to StT5 can be selected in the manner depicted in FIG. 1 for the communication between the stored-program control SPC, i.e., the master, and a slave SL1, SL2.

Figure 3:
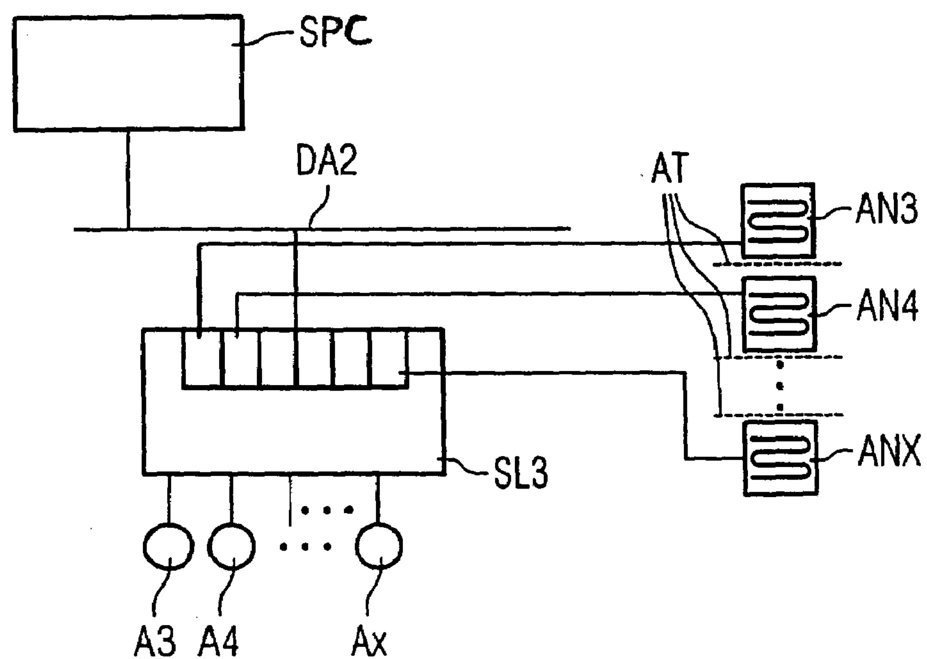
FIG. 3 shows a segment of a data network with a slave with different drive profiles.

The diagram of FIG. 3 shows a data link DA2 according to the invention. The data link DA2 connects the stored-program control SPC with a slave SL3. Various axes A3, A4, . . . , AX are associated with the slave SL3. The axes A3, A4, . . . , AX are sub-components of the component slave SL3. A data communication via data messages exists between the component slave SL3 and the component stored-program control SPC. The slave SL3 has drive profiles AN3, AN4, . . . , AX for the axes A3, A4, . . . , AX. The drive profiles AN3, AN4, . . . , AX can be separated in a data message by axis separators AT. The number of axes that can be included in the data communication can be increased by using sub-components, wherein data locations in a data message can be associated with the sub-components. This is particularly advantageous for use in printing presses which have a large number of axes.

Figures 4, 5:
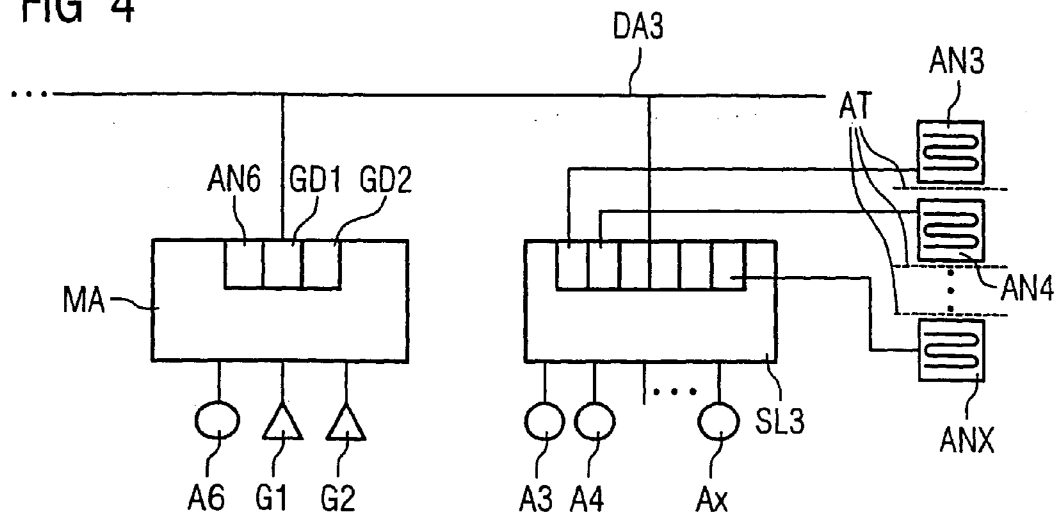
FIG. 4 shows a segment of a data network with transmitters as sub-components.
FIG. 5 depicts a data message.

The diagram of FIG. 4 depicts a data link D3 with a master MA or a slave SL3. The functionality of the stored-program control of FIG. 3 and FIG. 2, respectively, is assumed in FIG. 4 by the master MA which itself includes sub-components. An axis A6 and two transmitters G1, G2 are associated with the master MA as sub-components. For an exchange of a data messages between the master MA and the slave SL3, data locations can be formed for the master MA that include information about the drive profile AN6 and the transmitters, i.e. the data locations for the transmitters GT1 and GT2. The automation system according to FIG. 4 can include, for example, in addition to the master MA and the slave SL3 additional components that are connected via the data links DA3.

The diagram of FIG. 5 shows the structure of a freely generated data message. The data message includes data locations. The data locations are distinguished in the present example by assigning a process data number PZDNo to a data location. A distinction is also made to indicate if the content of the data location is a setpoint Set or an actual value Act. The data locations with the process data numbers 1, 2, 3, 4, 5, 6 also distinguish between a setpoint Set and actual values Act. The data location with the process data number 1 for a setpoint includes a control word 2. The process data locations with the process data numbers 2 and 3 are combined for a rotation speed setpoint NSOLL_B. The data location with the process data number 4 has as setpoint the control word 2 STW2. The data location with the process data number 5 includes the control word for a transmitter G1 G1_STW. The control word 3 STW3 is assigned to the data location with the process data number 6. The actual values Act can also be distinguished through process data numbers PZDNo. Standardized content analogous to the setpoints Set is associated with the data locations with process data numbers PZDNo from 1 to 7: state word 1 ZSW1, actual rotation speed value B NIST_B, state word 2 ZSW2, state word for the transmitters 1 G1_ZSW and actual value 1 of the transmitter 1 G1_XIST1. The number of the data locations as well as the association of the content of the data location with the data locations is freely configurable. The process data numbers correspond to the inputs and outputs of the sub-component assigned to a component. Since a clear distinction is made between actual values and setpoints, the same process data numbers PZDNo can exist for both an actual value Act and a setpoint Set.

However, the distinction depicted in FIG. 5 is not essential. In one embodiment (not shown), the content of the data locations can be assigned in such a way that the setpoints Set and actual values Act are arranged within a message in different sequential order.

Figure 6:
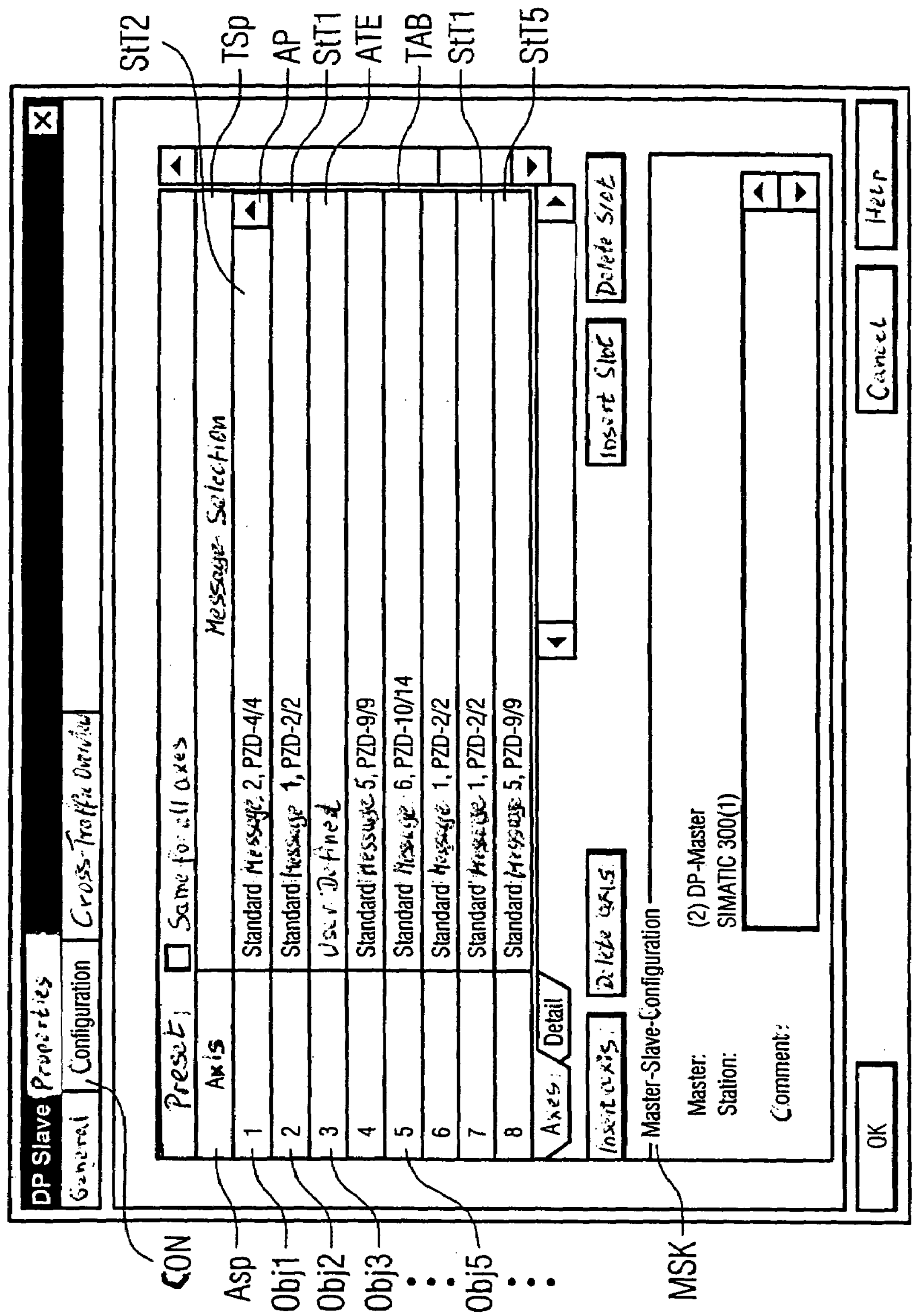
FIG. 6 shows an input window of an engineering system for selecting the message.

The diagram of FIG. 6 shows a window of a screen display of an engineering program for selecting messages from a message selection table TAB for a data message between two components of an automation system. A message for a slave can be selected in the toolbar icon configuration CON. A selectable message can be, for example, a standard message StT2 or a user-defined message ATE generated according to the present invention. In a column "Axis" Asp, wherein the term axis in the table displayed in FIG. 6 it is also to be understood as referring to an object, the following rows are provided for objects. A second column Tsp allows message selection for a first object Obj1. A table (not shown) for selecting a message can be addressed by a selection arrow AP. The selected messages StT1, StT2, . . . , StT5, ATE for the objects Obj1, Obj2, Obj3, . . . , Obj5, etc. of a component for a master-slave combination MSK are shown in the second column Tsp of FIG. 6. The standard messages StT1, StT2, . . . of the selected messages relate to the content of the conventional standard messages. According to the invention, the content of several conventional data messages is merged into a flexibly configurable data message. For example, since the content of the standard messages StT1 and StT2 depicted in FIG. 1 relates to axes, the objects Obj1 and 0bj2 are axis objects and the axis is a sub-component.

Like the diagram of FIG. 6, the diagram of FIG. 7 shows a window of the screen display of an engineering system for configuring a data link, illustrating a detailed window of the configuration of a data message generated by a user according to FIG. 6. FIG. 7 shows a first column SISp in which slot numbers SINo4, SINo5, SINo6, . . . indicate the subdivision of the data message. The rows of the slot numbers 4 and 5, SINo4 and SINo5, represent details of the object 1 Obj1 of FIG. 6. According to the standard message 1 StT1 of FIG. 1, the row of slot 4 SINo4 shows the actual values that correspond to row 4 Z4 of FIG. 1, with the row of slot 5 SINo5 showings the setpoints that correspond to the row 2 Z2 of FIG. 1. The table TA also shows addresses Adr, whereby the address of the slots SINo4, SINo5, etc. always corresponds to the first process data number. PROBIBUS parameters relating to the PROFIBUS partner indicate the type of a slot and the address of a slot. The label "drive" refers a component COMP. The rows of the slot numbers 7 and 8, SINo7, SINo8, in table TA show details of the object 2 Obj2 of FIG. 6. The objects 1 and 2, Obj1, Obj2, are separated by an axis separator AT in slot 6 SINo6. The axis separator AT separates sub-components in the data message from each other.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. An automation system for a machine-tool, a production machine or a robot, comprising:

at least two components connected via a data link, and at least two sub-components associatable with a component, wherein a data message, which includes data for the components and a plurality of data locations, can be sent between the at least two components, and wherein the number of the data locations within a data message is adjustable and each of the data locations is associatable with one of the sub-components.

2. The automation system of claim 1, wherein the data message is subdivided into channels, with the data of a channel being associated with a sub-component.

3. The automation system of claim 1, wherein the data locations have a standardized content.

4. The automation system of claim 3, wherein the standardized content comprises at least one of an actual value, a setpoint, a control word and a parameter.

5. The automation system of claim 1, wherein a sub-component includes an axis.

6. The automation system of claim 1, wherein one component represents a master within the data link and at least one second component represents a slave within the data link.

7. The automation system of claim 1, wherein the data message has a programmable variable length or a maximum length, or both.

8. The automation system of claim 1, and further comprising a message selection table that includes messages selected from the group consisting of standard messages and user-defined messages.

9. A method for programming a data communication of an automation system, for a machine-tool, a production machine or a robot, the system including at least two components connected via a data link and exchanging a data message that includes data locations and data for a component, comprising:

adjusting the number of the data locations of the data message for those components that have at least two sub-components, and associating each of the data locations with a respective one of the sub-components in one-to-one correspondence.

10. The method of claim 9, and further including the step of subdividing the data message into channels using object separators, wherein the data message in a channel refers to a sub-component.

11. The method of claim 9, wherein the data location includes a standardized content.

12. The method of claim 11, wherein the standardized content comprises at least one of an actual value, a setpoint, a control word and a parameter.

13. The method of claim 9, wherein a sub-component is programmed to represent an axis.

14. The method of claim 9, wherein one component within the data communication is programmed as a master and at least one other component is programmed as a slave.

15. A method for programming a data communication of an automation system, for a machine-tool, a production machine or a robot, the system including at least two components connected via a data link and exchanging a data message that includes data locations and data for a component, comprising the steps of:

programming the automation system and the at least two components with an engineering system, associating two sub-components with at least one component, said at least one component or sub-component including a predefined function, automatically composing the data message, and automatically associating a data location with one of the sub-components when the data message is automatically composed, wherein the number of the data locations within a data message is adjustable.

16. The method of claim 15, and further including the step of subdividing the data message into channels using object separators, wherein the data message in a channel refers to a sub-component.

17. The method of claim 15, wherein the data location includes a standardized content.

18. The method of claim 17, wherein the standardized content comprises at least one of an actual value, a setpoint, a control word and a parameter.

19. The method of claim 15, wherein a sub-component is programmed to represent an axis.

20. The method of claim 15, wherein one component within the data communication is programmed as a master and at least one other component is programmed as a slave.

21. An engineering system for programming a data communication in an automation system, the automation system including at least two components connected via a data link and exchanging a data message that includes data locations and data for a component, said programming including the steps of:

adjusting the number of the data locations of the data message for those components that have at least two sub-components, and associating each of the data locations with a respective one of the sub-components in one-to-one correspondence.

22. An engineering system for programming a data communication in an automation system, the automation system including at least two components connected via a data link and exchanging a data message that includes data locations and data for a component, said programming including the steps of:

associating two sub-components with at least one component, said at least one component or sub-component including a predefined function, automatically composing the data message, and automatically associating a data location with one of the sub-components when the data message is automatically composed, wherein the number of the data locations within a data message is adjustable.

* * * * *